Apr. 3, 1923.
E. VOELKER
DIRECTION SIGNAL AND PARKING LIGHT FOR VEHICLES
Filed Dec. 27, 1921
1,450,876
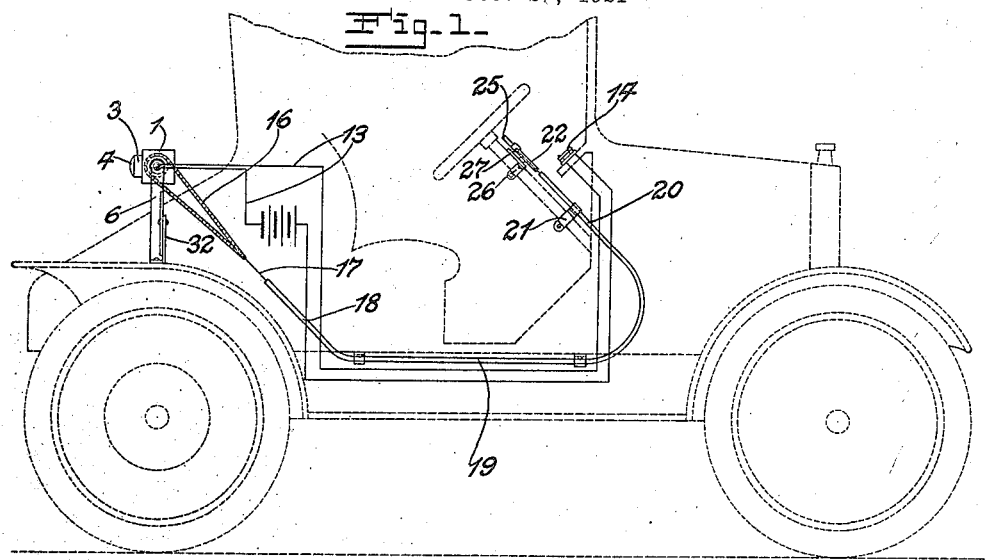
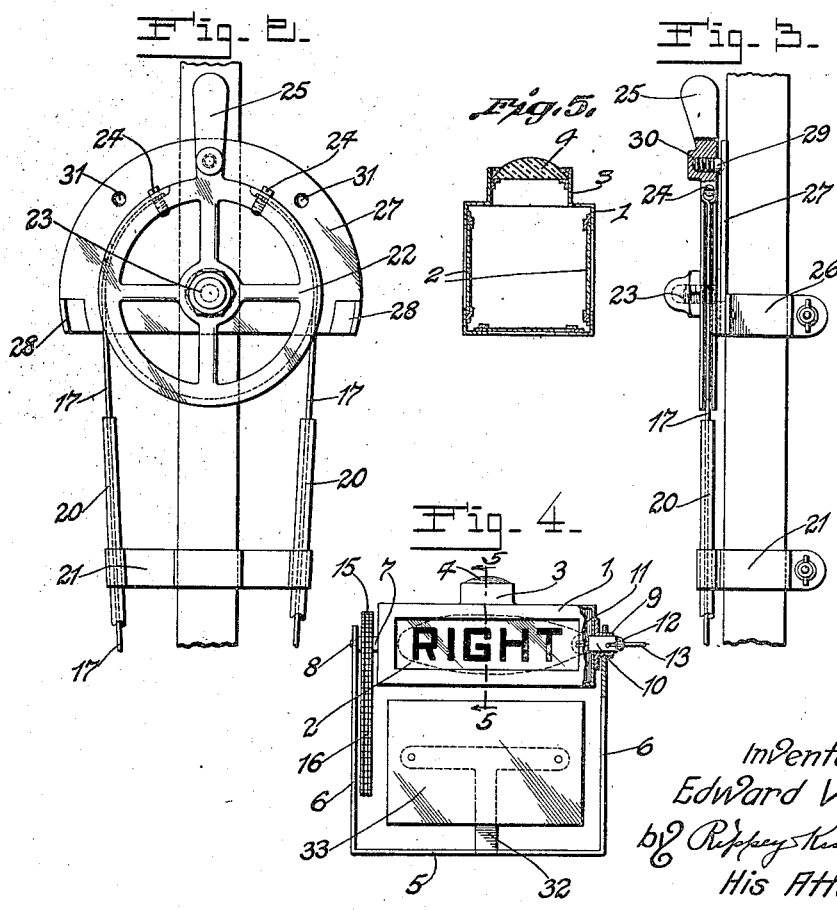
Inventor:
Edward Voelker,
by Rippey Kingsland
His Attorneys.

Patented Apr. 3, 1923.

1,450,876

UNITED STATES PATENT OFFICE.

EDWARD VOELKER, OF ST. LOUIS, MISSOURI.

DIRECTION SIGNAL AND PARKING LIGHT FOR VEHICLES.

Application filed December 27, 1921. Serial No. 524,989.

*To all whom it may concern:*

Be it known that I, EDWARD VOELKER, a citizen of the United States, residing at St. Louis, Missouri, have invented new and useful Direction Signal and Parking Lights for Vehicles, of which the following is a specification.

This invention relates to a direction signal and parking light for vehicles.

An object of the invention is to provide an improved device for use on automobiles and the like, with means for controlling the same for service as a direction signal and a parking light for the automobile.

Other objects will appear from the following description, reference being made to the drawing, in which—

Fig. 1 is a view showing my improved direction signal and parking light applied to an automobile.

Fig. 2 is a view showing the device for controlling the light.

Fig. 3 is a side elevation with a part in section of the controlling device.

Fig. 4 is a view showing the operating means for the signal and parking light, and also the arrangement of one of the windows of the signal.

Fig. 5 is a cross sectional view on the line 5—5 of Fig. 4.

The invention as shown comprises a frame 1 having windows in three sides thereof, two of which windows are parallel with each other and the third window is at right angles to said two windows. One of the two parallel windows is shown in Fig. 4, the same comprising a glass plate 2 mounted in the window opening in the frame and having an appropriate designation thereon for indicating a change in the movement of the automobile. As shown in Fig. 4 the designation on the window is the word "Right." In the preferred form of the invention the word "Left" will be on the window opposite the window having the word "Right" thereon, so that the two parallel windows have the designations "Right" and "Left" to indicate that the automobile is about to turn in such directions. The third window at right angles to the "Right" and "Left" windows may contain a designation such as the word "Stop."

The side of the frame 1 opposite from the third window includes a cylindrical extension 3 the diameter of which is much less than the length of any of the windows, said extension having a glass 4 therein for use as a parking light.

The frame is supported for rotation in the bracket adapted to be secured to one of the fenders or in any other desired position on the automobile. As shown, the bracket comprises a base 5 adapted to rest upon the fender or other part of the automobile, and a pair of vertical arms 6. The frame 1 is located between the arms 6 of the bracket and at one end has an extended hub member 7 provided with a pin 8 rotative in the upper portion of one of the arms 6 of the bracket. The other end of the case has a hub 9 rotative in the other arm 6 of the bracket. A non-rotative lamp socket 10 extends through the hub 9. The hub 9 of the frame 1 rotates around the socket 10, but said socket does not turn. A lamp 11 is supported by the inner end of the socket 10 within the frame 1. When the lamp is lighted all of the windows, as well as the glass plate 4, are illuminated.

A plug 12 in connection with the electric wires 13 is removably connected with the socket 10. The wires 13 are energized through the battery as shown, and the circuit may be opened and closed by the usual switch 14 on the instrument board of the automobile.

A sprocket wheel 15 is attached to the hub 7 of the frame and is engaged by a sprocket chain 16, the ends of which are connected to the rear ends of wires 17. The wires 17 extend through guide tubes to the operating device which is supported on the steering column, just below the steering wheel in position for convenient operation. Each of the guide tubes comprises a downwardly and forwardly inclined rear portion 18 having curved connection with a horizontal portion 19 located under the floor of the automobile body, and an upwardly and rearwardly extended portion 20 having curved connection with the horizontal portion 19. The parts 20 of the tubes extend parallel with the steering column in connection with which they are supported by a bracket 21. The tubes are formed with the up-turned ends 18 and 20 so that the tubes will contain and retain lubricant to facilitate the operation of the wires.

The ends of the wires 17 extend on opposite sides of a wheel 22 rotatively mounted on a support 23. The periphery of the wheel 22 has a circumferential groove for receiving the ends of the wires 17 and retaining the wires in proper relationship to the wheel. The ends of the wires 17 are attached to the wheel 22 by removable screws 24. A handle 25 extends radially from the wheel 22 between the ends of the wires 17 so that the wheel may be conveniently turned thereby.

It is apparent that turning the wheel in one direction will operate the connections to turn the frame 1 in the bracket 6 and that said frame 1 may be turned to present any of the windows or lights toward the front or rear. In the position shown in Figs. 1 and 2, the handle 25 extends upwardly and in such position the parking light glass 4 is toward the rear while the window in the frame opposite from the parking light is toward the front. This places the "Right" and "Left" windows horizontally so that they are not visible from the front and rear. It will be seen also that the parking light may be used as a tail light if desired.

The support 23 is in connection with a bracket 26 attached to the steering column. A frame 27 is carried by the bracket 26 and is provided with a pair of projections 28 adapted to be engaged by the handle 25 to limit turning movements of the wheel 22. When the wheel 22 is turned in either direction to the full extent of its movement to engage the handle 25 with either of the projections 28 the "Stop" window, that is the window opposite from the window 4, is at the rear. Thus it is immaterial in which direction the wheel 22 be turned to display the "Stop" signal.

The wheel 22 is equipped with a detent device for cooperation with the frame 27 to retain said wheel 22 in its different adjusted positions. As shown, the detent device comprises a detent 29 operative within a recess in the handle 25 in which a spring 30 is located to press the detent into engagement with the frame 27. The frame 27 is provided with a number of indentations or recesses 31 to receive the detent 29. One such recess is at the upper portion of the frame 27 and receives the detent 29 when the handle 25 extends upwardly. The other recesses 31 are between the uppermost recess and the projections 28 respectively. Thus when the wheel 22 is turned to move the handle 25 half way to the projection 28 at the right, the detent 29 will engage in the recess 31 on that side and will stop the turning of the frame 1 when the "Right" signal is displayed to the rear. So, also, when the wheel 22 is turned to the left half way to the projection 28, the detent 29 will engage in the recess 31 on that side when the "Left" signal is displayed at the rear. The wheel is thus latched in the different adjusted positions mentioned until manually operated.

It will be seen that all of the windows in the frame 1 are continuously illuminated when the lamp is lighted. This characteristic is utilized to illuminate the tail light plate. The bracket 5—6 has a T-shaped arm 32 (Fig. 4) for supporting the license plate 33 below the signal device and in position to be illuminated by the light reflected through the window at the lower side of the signal, irrespective of the position of the signal.

From the foregoing it will be seen that my invention is of a very simple and efficient construction and, in one self-contained device, obtains all of the desired results. The specific construction and arrangement may be varied in certain particulars without departure from the principle of the invention.

What I claim and desire to secure by Letters Patent, is:—

1. In a device of the character described, the combination of an elongated rotary frame which is rectangular in cross section, a pair of relatively long windows arranged in parallel planes at opposite sides of the frame, a cylindrical extension from one of the plane sides of the frame which is at right angles to the two windows which is of a diameter relatively much less than the length of either of said windows, a window in said extension, a bracket for supporting the frame for rotary movements on its longitudinal axis, an axial member supporting one end of the frame in said bracket, a cylindrical hub rigid with the opposite end of the frame and journaled in said bracket, a lamp socket in said hub, a lamp supported by said socket within the frame, a circuit for said lamp, and means for rotating said frame in said bracket.

2. In a device of the character described, the combination of an elongated rotary frame which is rectangular in cross section, a pair of relatively long windows in parallel planes at opposite sides of the frame, a relatively long third window in the frame at right angles to the pair of windows, a cylindrical extension from one of the plane sides of the frame which is at right angles to said pair of windows and opposite from said third window and which has a diameter relatively much less than the length of any of said windows, a window in said extension, a bracket for supporting the frame for rotary movements, an axial member in connection with one end of said frame journaled in said bracket, a cylindrical hub rigid with the opposite end of said frame journaled in said bracket, a non-rotative lamp socket extending through said hub, a lamp supported by said socket inside of said frame for lighting all of said windows, and a device in connection with said axial member for rotating said frame.

EDWARD VOELKER.